United States Patent Office 3,513,227
Patented May 19, 1970

3,513,227
PROCESS FOR OBTAINING VINYLIC RESIN COMPOSITIONS IN THE FORM OF NON-STICKING POWDERS
Robert De Coene and Francois Lardinoit, Brussels, Belgium, assignors to Solvay & Cie, Brussels, Belgium, a Belgian corporation
No Drawing. Filed Dec. 29, 1967, Ser. No. 694,406
Claims priority, application Netherlands, Jan. 3, 1967, 6700053
Int. Cl. C08f 47/00
U.S. Cl. 260—887                                  7 Claims

ABSTRACT OF THE DISCLOSURE

A new resin product containing a mixture of 99–50% by weight of vinylic resin and 1–50% by weight of an elastomer in the form of a fine, non-sticky powder, easily transformable into a homogeneous gelatinized mass is obtained by a two stage treatment. The treatment involves coagulating a latex, the solid material of which is composed of an elastomer or a mixture of a elastomer and a vinylic polymer, in an aqueous suspension of a vinylic resin obtained by means of polymerization in aqueous suspension, and coagulating a small quantity of a latex of a hard vinylic polymer by the addition thereof under agitation to the mixture obtained in the first stage. The aqueous phase of the mixture is then separated from the solid product.

BACKGROUND OF THE INVENTION

The present invention pertains to a process for obtaining, in the form of a dry and non-sticky powder, mixtures having a base of vinylic resin and elastomer and to the products thus obtained.

Among the elastomers considered for use in vinylic resin compositions the following may be more particularly cited: the acetate copolymers of vinyl acetate-ethylene, the polybutadienes, the copolymers of butadiene with one or several monomers such as styrene, acrylonitrile and methyl methacrylate, the polymers of substituted butadienes such as polyisoprene and the polymers of chlorbutadienes such as neoprene. These elastomers are utilized particularly for the coating of various supports. In addition, they constitute excellent macromolecular, or polymer additives, certain resin compositions containing quantities of elastomer have especially improved shock resistance.

The above-mentioned elastomers can be prepared readily in the form of an aqueous latex by any known process of polymerization in aqueous emulsion.

The vinylic resins, on the other hand are known to exist in several varieties; and the properties of vinylic resins differ depending on the polymerization process which has been used for their preparation. Therefore, a vinylic resin such as poly(vinyl chloride), polystyrene, poly(methyl methacrylate), obtained by means of polymerization in aqueous suspension, generally has properties which distinguish it from the same resin obtained by means of polymerization in aqueous emulsion. In particular, it may be notably more porous and, consequently, more capable of absorbng the various additives plasticizers, stabilizers—necessary to make it useful and workable. Further, a vinylic resin prepared by polymerization in aqueous suspension is purer, in view of the fact that the various ingredients, such as catalyzers, the agents for putting it into suspension, and so forth are more easily eliminated by means of washing. Finally, the finished products manufactured from a vinylic resin obtained by means of polymerization in aqueous suspension are generally more transparent.

The properties of vinylic resin derivatives vary in a similar way, depending on the method of polymerization employed in the preparation of the resin base. This is the case, in particular with respect to post-chlorinated poly(vinyl chloride).

However, the vinylic resins obtained by means of polymerization in aqueous suspension, as well as the resins which originate therefrom are deficient for certain applications, with regard to a number of their properties, in particular their resistance to shock.

Thus it is desirable, for various applications, to use mixtures having a vinylic resin base obtained by means of polymerization in aqueous suspenson and an elastomer.

If the solid products are simply mixed together, in the majority of cases, compositions are obtained which are difficult to gelatinize and which, after insufficient gelification, are heterogeneous. The activation of these mixtures produces articles lacking in transparency and which are deficient in mechanical properties.

In order to obtain homogeneous compositions, a latex of elastomer can be mixed with an aqueous suspension of the vinylic resin and the latex can be coagulated from the suspension. However, certain difficulties are encountered using this procedure, even when a minimum quantity of elastomer is used. In effect, the resulting solid product, after washing and drying, generally tends to aggregate to form into a mass during storage.

It has been found that the above mentioned difficulties may be overcome by means of the present invention as described hereinafter.

SUMMARY OF THE INVENTION

The present invention pertains to a process for obtaining, in the form of a dry and non-sticky powder, easily transformable into a homogeneous gelatinized mass, mixtures comprised of 99–50% in weight of vinylic resins and 1–50% in weight of an elastomer by a two stage treatment. The first stage of this treatment comprises coagulating a latex in an aqueous suspension of a vinylic resin obtained by means of polymerization in aqueous suspension, the solid material of said latex being an elastomer or possibly a mixture of latex and vinylic polymer. And the second stage of the treatment comprises adding under agitation, a latex of a hard vinylic polymer to the mixture of coagulated latex, the latex of hard vinylic polymer being thereby coagulated. The aqueous phase of the mixture is then separated from the solid product, and the solid product is normally washed and dried.

DESCRIPTION OF THE PREFERRED EMBODIMENTS

Vinylic polymers, which can be employed in the composition of the latex which is coagulated in the first stage include, for example, poly(vinyl chloride), polystyrene or poly(methyl methacrylate).

The vinylic resin on which the latex is coagulated during the first stage of treatment is obtained by means of any known process of polymerization in aqueous suspension, with the aid of a catalyzer soluble in the monomer, such as organic peroxides, and azo compounds and in the presence of a protective colloid, such as poly(vinyl alcohol), and the derivatives of cellulose.

Vinylic resins obtained by means of polymerization in aqueous suspension include resins which are derivatives thereof and which appear in the same form.

The vinylic resin obtained by means of polymerization in aqueous suspension is preferably selected from the group comprising poly(vinyl chloride), post-chlorinated poly(vinyl chloride), polystyrene and poly(methyl methacrylate).

In certain cases, in the second stage of the treatment in order to obtain the desired result, it is sufficient to add or to coagulate 0.5% by weight of hard vinylic polymer based on the weight of the solid resin contained in the mixture after the first stage of treatment. In other cases, it may be necessary to use up to 25% in weight of hard vinylic polymer. Generally, it is sufficient to use 1–10% of it by weight of the hard vinylic polymer.

It has been found that it is possible to use more than 25% in weight of hard polymer during the second stage of treatment, however, a less homogeneous mixture is obtained thereby, particularly with respect to the heterogeneity of the resultant grains of product.

The expression "hard" polymer and "hard" vinylic resin, are used to distinguish this polymeric material from the elastomeric material used in the present process. Hard polymers are vinylic resins which may be obtained in the form of a latex, which, after coagulation yield a dry, non-sticky powder.

The hard vinylic polymer employed during the second stage of the process may be selected advantageously from the group comprising poly(vinyl chloride), polystyrene and poly(methyl methacrylate).

Among the elastomers which may be used in accordance with the process of this invention to yield useful vinylic resin compositions in the form of a fine powder, which does not stick, and which does not aggregate during storage, the following are particularly cited:

acetate copolymers of vinyl acetate-ethylene,
polybutadienes,
copolymers of butadiene with one or several monomers such as methyl methacrylate, styrene and acrylonitrile,
polymers of substituted derivatives of butadiene, including particularly lower alkyl and halogenated derivatives such as polyisoprene and poly(chlorbutadiene) or neoprene.

The formation of a solid mass during the storage of vinylic resin compositions containing about 1% of elastomer is commonly observed from the composition is obtained in the ordinary manner of coagulating a latex of elastomer in admixture with an aqueous suspension of vinylic resin. Thus, the process of the invention becomes particularly useful when the vinylic resin composition desired must contain about 1% by weight of an elastomer. The formation of a solid mass is observed during the storage of vinylic compositions when the process for preparing the vinylic composition consists only of coagulating a latex of the elastomer in an aqueous suspension of the vinylic resin.

By means of the process of the invention, it is possible to prepare compositions in the form of a dry and non-sticky powder, which may contain almost 100% in weight of an elastomer. However, mixtures containing more than 50% by weight of the elastomer are not worthwhile. Thus, starting with compositions containing about 50% by weight of elastomer, the mixtures become more and more heterogeneous and thereby have properties which are less and less desirable.

In order to improve certain properties, such as resistance to shock, of vinylic resins obtained by means of polymerization in aqueous suspension, in the particular case wherein the elastomer selected in an acetate copolymer of vinyl acetate-ethylene, the latter must not contain more than 95% by weight of acetate. When the acetate content of the copolymer is below 45% by weight, the process of this invention becomes superfluous, in view of the fact that the difficulty, represented by the sticking together, or massing of the pulverized mixture, no longer exists.

The solid mixtures prepared according to the process of the invention may be utilized just as they are, or they may be mixed readily with other resins for the purpose of changing the properties of same, more particularly their resistance to shock. In this manner, the compositions of this invention may be added to poly(vinyl chloride), to the copolymers of vinyl chloride, to post-chlorinated poly(vinyl chloride), to polystyrene and the like. Powders are obtained which can be gelatinized easily, are sufficiently homogeneous and are easy to use.

Any known coagulation technique is suitable for the present process. For example, latex with a base of an elastomer may be poured with stirring into an aqueous solution of an electrolyte, such as calcium chloride or aluminum sulphate, containing in suspension, the vinylic resin obtained by means of polymerization in aqueous suspension. In certain cases, it is useful to equip the coagulation vat or tank with a chopping apparatus.

It is preferable not to interrupt the agitation between the first and second stage of the treatment. At the time of the second stage, one does not necessarily have to add an additional quantity of coagulating solution, the operation can be limited to allowing the latex of the hard vinylic polymer to flow in the reacting mixture. A part of the aqueous phase between the first and the second stage of the process can be separated, but this alternative, in the majority of cases, is only of limited interest.

Examples 1, 3, 5, 7, 12, 14, 17, 19, 23, 25, 29 and 31 indicated hereinafter, are given as a means of comparison. Examples 2, 4, 6, 8, 9, 10, 11, 13, 15, 16, 18, 20, 21, 22, 24, 26, 27, 28, 30, 32, 33 and 34 are given to illustrate the process of the invention, but must not be interpreted as limiting the scope thereof in any manner whatsoever.

In the examples given, the poly(vinyl chloride) in suspension in the coagulating solution contains a number or quantity K measured in the cyclohexanone of 72, and which has been obtained by polymerization of vinyl chloride in aqueous suspension, at 52° C., with the help of lauroyl peroxide and in the presence of polyvinylic alcohol as a protective colloid. The number K is a measure of the molecular weight of the polymer as described by H. Fikentscher, in Cellulosechemi, 1932, 13, p. 60.

In Examples 5, 6, 22, 23, 24, 25, 26 and 33 given, the post-chlorinated poly(vinyl chloride) has a chlorine content of 680 g./kg. of polymer and has been obtained by means of chlorination in aqueous suspension of the above-mentioned vinyl polychloride, at 55° C., with the help of a gaseous chlorine.

In all of the examples given, the coagulation of the latex has been achieved, by agitation in a 30 l. vat or tank containing the solution of the electrolyte and the vinylic resin obtained by means of polymerization in aqueous suspension.

The concentration of the latex is uniformly 300 g. of polymer per kg. of latex. Aluminum sulphate is used as a coagulant at the rate of 20 g. of crystals of $Al_2(SO_4)_3 \cdot 16\ H_2O$ per kg. of polymer to be coagulated, in accordance with Examples 1–16 and at the rate of 80 g. in accordance with Examples 17–34.

The suspensions after coagulation contain 200 g. of polymer per kg.

EXAMPLE 1

Into an aqueous solution of the electrolyte containing an agitated suspension of 1900 g. of poly(vinyl chloride) is poured a latex containing 100 g. of an acetate copolymer of vinyl acetate-ethylene containing 67% in weight of acetate and the number or quantity of K which is measured in the cyclohexanone at 20° C. is 90.

The mixture, after coagulation, is drained and washed. It is dried at 70° C. in a ventilated oven. The product is sticky. It agglomerates when it is dried.

EXAMPLE 2

Into an aqueous solution of the electrolyte containing an agitated suspension of 1700 g. of poly(vinyl chloride), is poured, in the latex state, 200 g. of the same acetate copolymer of vinyl acetate-ethylene which was employed in accordance with Example 1; to the suspension is then added 100 g. of poly(vinyl chloride), in the latex state. The mixture obtained after coagulation is drained and washed. It is then dried at 70° C. The product comes out in the form of a non-sticky powder, which does not have any tendency to form into a mass.

EXAMPLE 3

Into an aqueous solution of the electrolyte containing in an agitated suspension, 1600 g. of poly(vinyl chloride), is poured a mixture of latex containing 200 g. of the same acetate copolymer of vinyl acetate-ethylene which was employed in accordance with Example 1 and 200 g. of poly(vinyl chloride). The mixture obtained is drained and washed. It is then dried at 70° C. The resultant product is agglomerated.

EXAMPLE 4

Into an aqueous solution of the electrolyte containing in agitated suspension, 1580 g. of poly(vinyl chloride), is poured a mixture of latex containing 200 g. of the same copolymer which was employed in accordance with Example 1 and 200 g. of poly(vinyl chloride). To the suspension 20 g. of poly(vinyl chloride) in the latex state is then added. The mixture obtained is drained, washed and dried at 70° C. The product comes out in the form of a non-sticky power, which does not have any tendency to form into a mass.

EXAMPLE 5

Into an aqueous solution of the electrolyte containing in agitated suspension, 1800 g. of post-chlorinated poly(vinyl chloride), is poured, in the latex state, 200 g. of an acetate copolymer of vinyl acetate-ethylene containing 47% in weight of acetate and the number or quantity K of which is measured in the cyclohexanone at 20° C. is 60. The mixture obtained after coagulation, is drained, washed and dried at 70° C. The product is sticky and forms into a mass at the time that it is dried.

EXAMPLE 6

Into an aqueous solution of the electrolyte containing in agitated suspension, 1780 g. of post-chlorinated poly(vinyl chloride), is poured, in the latex state, 200 g. of the same acetate copolymer of vinyl acetate-ethylene which was employed in accordance with Example 5. To the mixture is added 20 g. of poly(vinyl chloride) in the latex state. The mixture obtained is drained, washed and dried. The product comes out in the form of a non-sticky powder, which does not have any tendency to agglomerate.

EXAMPLE 7

Into an aqueous solution of the electrolyte containing in agitated suspension, 1900 g. of polystyrene obtained by means of polymerization in aqueous suspension, is poured in the latex state, 100 g. of an acetate copolymer of vinyl acetate-ethylene containing 93% in weight of acetate and the number K measured in the cyclohexanone at 20° C. is 120.

The mixture obtained is drained and washed. It is dried at 70° C. in a ventilated oven.

The product is sticky. It forms into a mass at the time it is dried.

EXAMPLE 8

Into an aqueous solution of the electrolyte containing in agitated suspension 1840 g. of polystyrene obtained by means of polymerization in aqueous suspension, is poured in the latex state, 100 g. of an acetate copolymer of vinyl acetate-ethylene containing 93% in weight of acetate and the number of quantity K of which measured in the cyclohexanone at 20° C. is 120. A suspension is obtained which is reduced into fine particles less than 1 mm. by means of a chopping device. To the suspension is then added 60 g. of poly(vinyl chloride) in the form of latex. The mixture formed is drained, washed and dried at 70° C. The product obtained comes out in the form of a fine, non-sticky powder, which does not have any tendency to form into a mass.

EXAMPLE 9

Into an aqueous solution of the electrolyte containing in agitated suspension 1740 g. of poly(methyl methacrylate) obtained by means of polymerization in aqueous suspension, is poured in the latex state, 200 g. of the same acetate copolymer of vinyl acetate-ethylene which was employed in accordance with Example 7. A suspension is obtained which is reduced into fine particles less than 1 mm. by means of a chopping device. To the suspension is then added 60 g. of poly(vinyl chloride) in the form of latex. The mixture obtained is drained, washed and dried at 70° C. The product comes out in the form of a fine, non-sticky powder, which does not have any tendency to form into a mass.

EXAMPLE 10

Into an aqueous solution of the electrolyte containing in agitated suspension 1540 g. of poly(vinyl chloride), is poured in the latex state, 400 g. of the same acetate copolymer of vinyl acetate-ethylene which was employed in accordance with Example 1. A suspension is obtained which is reduced into fine particles less than 1 mm. by means of a chopping device. To the suspension is then added 60 g. of poly(vinyl chloride) in the form of latex. The mixture obtained is drained, washed and dried. The product is a fine, non-sticky powder, which does not have any tendency to form into a mass.

EXAMPLE 11

Into an aqueous solution of the electrolyte containing in agitated suspension 900 g. of poly(vinyl chloride), is poured in the latex state, 1000 g. of the same acetate copolymer of vinyl acetate-ethylene, which was employed in accordance with Example 1. A suspension is obtained which is reduced into fine particles less than 1 mm., by means of a chopping device. To the suspension is then added 100 g. of poly(vinyl chloride) in the form of latex. The mixture obtained is drained, washed and dried at 70° C. The product comes out in the form of a fine, non-sticky powder, which does not have any tendency to form into a mass.

EXAMPLE 12

Into an aqueous solution of the electrolyte containing in agitated suspension 1980 g. of poly(vinyl chloride), is poured in the latex state, 20 g. of the same acetate copolymer of vinyl acetate-ethylene, which was employed in accordance with Example 1.

Upon contact with the electrolyte, the latex coagulates into flakes.

The mixture obtained is drained, washed and dried at 70° C.

The product is sticky and forms into a mass at the time of storage.

EXAMPLE 13

Into an aqueous solution of the electrolyte containing an agitated suspension 1960 g. of poly(vinyl chloride), and by means of the action of a chopping device, is poured in the latex state, 20 g. of the same acetate copolymer of vinyl-acetate-ethylene, which was employed in accordance with Example 1.

During the period of time in which it is forming, the mixture of resins is chopped into small particles which remain in suspension. To this suspension is then added 20 g. of poly(vinyl chloride) in the form of latex.

The temperature is brought to and maintained at 70° C. over a period 30 minutes. After cooling at 25° C., the mixture obtained is drained, washed and dried.

The product is a fine, non-sticky powder, which does not have any tendency to form into a mass.

EXAMPLE 14

Into an aqueous solution of the electrolyte containing in agitated suspension 1798 g. of poly(vinyl chloride), and by means of the action of a chopping device, is poured in the latex state, 200 g. of the same acetate copolymer of vinyl acetate-ethylene, which was employed in accordance with Example 1.

During the period of time in which it is forming, the mixture of resins is chopped into small particles which remain in suspension.

To this suspension is then added 2 g. of poly(vinyl chloride) in the form of latex.

The temperature is brought and maintained at 70° C. over a period of 30 minutes.

After cooling at 25° C., the mixture obtained is drained, washed and dried.

The product is sticky and forms into a mass at the time of drying.

EXAMPLE 15

Into an aqueous solution of the electrolyte containing in agitated suspension 1740 g. of poly(vinyl chloride) and by means of the action of a chopping device, is poured in the latex state, 200 g. of the same acetate copolymer of vinyl acetate-ethylene, which was employed in accordance with Example 1.

During the period of time in which it is forming, the mixture of resins is chopped into fine particles which remain in suspension.

To this suspension is then added 60 g. of poly(methyl methacrylate) in the form of latex.

The temperature is brought and maintained at 70° C. over a period of 30 minutes.

After cooling at 25° C., the mixture obtained is drained, washed and dried.

The product is a fine, non-sticky powder, which does not have any tendency to form into mass.

EXAMPLE 16

Into an aqueous solution of the electrolyte containing in agitated suspension 1740 g. of poly(vinyl chloride) and by means of the action of a chopping device, is poured in the latex state, 200 g. of the same acetate copolymer of vinyl acetate-ethylene, which was employed in accordance with Example 1.

During the period of time in which it is forming, the mixture of resins is chopped into fine particles which remain in suspension.

To this suspension is then added 60 g. of polystyrene in the form of latex.

The temperature is brought to and maintained at 70° C. over a period of 30 minutes.

After cooling at 25° C., the mixture obtained is drained, washed and dried.

The product is a fine, non-sticky powder, which does not have any tendency to form into a mass.

EXAMPLE 17

Into an aqueous solution of the electrolyte heated to 70° C., containing in agitated suspension 1980 g. of poly(vinyl chloride) and by means of the action of a chopping device is poured in the latex state, 20 g. of a copolymer comprised of 36% by weight of butadiene and 64% by weight of methyl methacrylate, sold by the Imperial Chemical Industries Ltd. under the trademark of Butakon ML501.

Upon contact with the electrolyte, the latex coagulates.

The temperature is brought and maintained at 90° C. over a period of 30 minutes.

After cooling at 25° C., the grains of the polymers are drained and washed with water. It is then dried in a ventilated oven at 50° C.

The solid product forms into a mass at the time of storage.

EXAMPLE 18

Into an aqueous solution of the electrolyte heated to 70° C., containing in agitated suspension 1960 g. of poly(vinyl chloride), and by means of the action of a chopping device, is poured in the latex state, 20 g. of the same copolymer, which was employed in accordance with Example 17.

After coagulation, 20 g. of poly(vinyl chloride), in the latex state, is added to the suspension, which then coagulates.

The temperature is brought to and maintained at 90° C. over a period of 30 minutes.

After cooling at 25° C., the grains of the polymers are drained and washed with water.

After drying, the product comes out in the form of a fine powder, which does not form into a mass at the time of storage.

EXAMPLE 19

Into an aqueous solution of the electrolyte heated to 70° C., containing in agitated suspension 1800 g. of poly(vinyl chloride), and by means of the action of a chopping device, is poured in the latex state, 200 g. of the same copolymer, which was employed in accordance with Example 17.

After coagulation, the temperature is brought to and maintained at 90° C. over a period of 30 minutes.

After cooling at 25° C., the mixture obtained is drained, washed and dried.

The product forms into a mass during storage.

EXAMPLE 20

Into an aqueous solution of the electrolyte heated to 70° C., containing in agitated suspension 1740 g. of poly(vinyl chloride), and by means of the action of a chopping device, is poured in the latex state, 200 g. of the same copolymer, which was employed in accordance with Example 17.

After coagulation to the suspension is then added 60 g. of poly(methyl methacrylate) in the form of latex, which then coagulates.

The temperature is brought to and maintained at 90° C. over a period of 30 minutes.

After cooling at 25° C., the mixture obtained is drained, washed and dried.

The product comes out in the form of a fine powder, which does not form into a mass at the time of storage.

EXAMPLE 21

Into an aqueous solution of the electrolyte heated to 70° C., containing in agitated suspension 1500 g. of poly(methyl methacrylate) obtained by means of polymerization in aqueous suspension, and by means of the action of a chopping device, is poured in the latex state, 400 g. of the same copolymer, which was employed in accordance with Example 17.

After coagulation, to the suspension is then added 100 g. of poly(methyl methacrylate) in the form of latex, which then coagulates.

The temperature is brought to and maintained at 90° C. over a period of 30 minutes.

After cooling at 25° C., the mixture obtained is drained, washed and dried.

The dry product is a fine powder, which does not form into a mass at the time of storage.

EXAMPLE 22

Into an aqueous solution of the electrolyte heated to 70° C., containing in agitated suspension 800 g. of post-chlorinated poly(vinyl chloride), and by means of the action of a chopping device, is poured in the latex state, 1000 g. of the same copolymer, which was employed in accordance with Example 17.

After coagulation, to the suspension 200 g. of poly(vinyl chloride) is added in the latex state, which then coagulates.

The temperature is brought to and maintained at 90° C. over a period of 30 minutes.

The product obtained after washing and drying is a fine powder, which does not form into a mass at the time of storage.

EXAMPLE 23

In an aqueous solution of the electrolyte heated to 70° C., containing, in agitated suspension, 1980 g. of postchlorinated poly(vinyl chloride), and by means of the action of a chopping device, is poured in the latex state, 20 g. of a copolymer comprised of 62% in weight of butadiene and 38% by weight of styrene, sold under the trademark of Hycar 2550H5.

After coagulation, the temperature is brought and maintained at 90° C. over a period of 30 minutes.

The product obtained after washing and drying forms into a mass at the time of storage.

EXAMPLE 24

Into an aqueous solution of the electrolyte heated to 70° C., containing in agitated suspension, 1960 g. of post-chlorinated poly(vinyl chloride) and by means of the action of a chopping device, is poured in the latex state, 20 g. of the same copolymer, which was employed in accordance with Example 23.

After coagulation, to the suspension 20 g. of poly(vinyl chloride) in the form of latex is then added which then coagulates.

The temperature is brought to and maintained at 90° C. over a period of 30 minutes.

The product obtained after draining, washing and drying, is a fine powder, which does not form into a mass at the time of storage.

EXAMPLE 25

Into an aqueous solution of the electrolyte heated to 70° C., containing in agitated suspension 1800 g. of post-chlorinated poly(vinyl chloride), and by means of the action of a chopping device, is poured in the latex state, 200 g. of the same copolymer, which was employed in accordance with Example 23.

After coagulation, the temperature is brought to and maintained at 90° C. over a period of 30 minutes.

The product obtained after draining, washing and drying, forms into a mass at the time of storage.

EXAMPLE 26

Into an aqueous solution of the electrolyte heated to 70° C., containing in agitated suspension 1740 g. of post-chlorinated poly(vinyl chloride), and by means of the action of a chopping device, is poured in the latex state 20 g. of the same copolymer, which was employed in accordance with Example 23.

After coagulation to the suspension is then added 60 g. of polystyrene in the latex state which then coagulates.

The temperature is brought to and maintained at 90° C. over a period of 30 minutes.

The product obtained after draining, washing and drying is a fine powder, which does not form into a mass at the time of storage.

EXAMPLE 27

In an aqueous solution of the electrolyte heated to 70° C., containing in agitated suspension 1500 g. of polystyrene, obtained by means of polymerization in aqueous suspension, and by means of the action of a chopping device, is poured in the latex state, 400 g. of the same copolymer, which was employed in accordance with Example 23.

After coagulation to the suspension is then added 100 g. of polystyrene in the form of latex which then coagulates.

The temperature is brought to and maintained at 90° C. over a period of 30 minutes.

The product obtained after draining, washing and drying is a fine powder which does not form into a mass at the time of storage.

EXAMPLE 28

In an aqueous solution of the electrolyte heated to 70° C., containing in agitated solution, 800 g. of poly(vinyl chloride), and by means of the action of a chopping device, is poured in the latex state, 1000 g. of the same copolymer, which was employed in accordance with Example 23.

After coagulation, to the suspension is then added 200 g. of polystyrene in the form of latex, which then coagulates.

The temperature is brought to and maintained at 90° C. over a period of 30 minutes.

The product obtained after draining, washing and drying, is a fine powder which does not form into a mass at the time of storage.

EXAMPLE 29

In an aqueous solution of the electrolyte heated to 70° C., containing in agitated suspension 1980 g. of polystyrene, obtained by means of polymerization in aqueous suspension, and by means of the action of a chopping device, is poured in the latex state, 20 g. of neoprene (poly [2]chlorobutadiene).

After coagulation, the temperature is brought to and maintained at 90° C. over a period of 30 minutes.

The product obtained after draining, washing and drying forms into a mass at the time of storage.

EXAMPLE 30

In an aqueous solution of the electrolyte heated to 70° C., containing in agitated suspension 1960 g. of polystyrene, obtained by means of polymerization in aqueous suspension, and by means of the action of a chopping device, is poured in the latex state, 20 g. of neoprene.

After coagulation to the suspension is then added 20 g. of polystyrene in the form of latex, which then coagulates.

The temperature is brought to and maintained at 90° C. over a period of 30 minutes.

The product obtained after draining, washing and drying, is a fine powder, which does not form into a mass at the time of storage.

EXAMPLE 31

In an aqueous solution of the electroylte heated to 70° C., containing in agitated suspension 1800 g. of poly(vinyl chloride), and by means of the action of a chopping device, is poured in the latex state, 200 g. of neoprene.

After coagulation, the temperature is brought to and maintained at 90° C. over a period of 30 minutes.

After draining, washing and drying, a product is obtained which forms into a mass at the time of storage.

EXAMPLE 32

In an aqueous solution of the electrolyte heated to 70° C., containing in agitated suspension 1740 g. of poly(vinyl chloride), and by means of the action of a chopping machine, is poured in the latex state, 200 g. of neoprene.

After coagulation, to the suspension is then added 60 g. of poly(viuyl chloride) in the latex state, which then coagulates.

The temperature is brought to and maintained at 90° c. over a period of 30 minutes.

The product obtained after draining, washing and drying, comes out in the form of a fine powder, which does not form into a mass at the time of storage.

EXAMPLE 33

In an aqueous solution of the electrolyte heated to 70° C. containing in agitated suspension 1500 g. of post-chlorinated poly(vinyl chloride), and by means of the action of a chopping device, is poured 400 g. of neoprene in the latex state.

After coagulation to the suspension is then added 100 g. of poly(vinyl chloride) in the form of a latex, which then coagulates.

The temperature is brought to and maintained at 90° C. over a period of 30 minutes.

After draining, washing and drying, a fine powder is obtained, which does not form into a mass at the time of storage.

EXAMPLE 34

In an aqueous solution of the electrolyte heated to 70° C,. containing in agitated suspension 800 g. of poly(methyl methacrylate), obtained by means of polymerization in aqueous suspension, and by means of the action of a chopping device, is poured 1000 g. of neoprene in the latex state.

After coagulation to the suspension is then added 200 g. of poly(methyl methacrylate) in the form of a latex which then coagulates.

The temperature is brought to and maintained at 90° C. over a period of 30 minutes.

The product obtained after draining, washing and drying is a fine powder which does not form into a mass at the time of storage.

What we claim and desire to secure by letters patent is:

1. Process for obtaining mixtures comprised of 99–50% by weight of vinylic resin and 1–50% by weight of an elastomer in the form of a dry, non-sticky powder, easily transformable into a homogeneous gelatinized mass by a two stage treatment which comprises:
   (1) coagulating a latex in an agitated aqueous suspension of a vinylic resin obtained by polymerization in aqueous suspension, the solid material of said latex being comprised of said elastomer or a mixture of said elastomer and vinylic polymer,
   (2) adding to the thus-formed mixture, under agitation, a latex of a hard vinylic polymer which is thereby coagulated, and then separating the solid product from the aqueous phase of the mixture.
   (2) adding to the thus-formed mixture, under agita- of washing and then drying said solid product.

2. Process according to claim 1 wherein said elastomer is selected from a group consisting of acetate copolymers of vinyl acetate-ethylene containing 45–95% by weight of acetate, polybutadienes, copolymers of butadiene with at least one monomer selected from the group consisting of methyl methacrylate, styrene and acrylic nitrile, and polymers of substituted derivatives of butadiene.

4. Process according to claim 1 wherein said vinylic resin obtained by means of polymerization in aqueous suspension is selected from the group consisting of poly(vinyl chloride), post-chlorinated poly(vinyl chloride), polystyrene, and poly(methyl methacrylate).

5. Process according to claim 1 wherein said vinylic polymer in said mixture of said elastomer and vinylic polymer is selected from the group consisting of poly(vinyl chloride), polystyrene and poly(methyl methacrylate).

6. Process according to claim 1 wherein said hard vinylic polymer coagulated during the second stage of treatment is selected from the group consisting of poly(vinyl chloride), polystyrene and poly(methyl methacrylate).

7. Process according to claim 1 wherein the quantity of hard vinylic polymer latex coagulated during the second stage of treatment is such that the quantity of hard vinylic polymer represents 0.5–25% by weight of the solid material formed during the first stage of said treatment.

References Cited

UNITED STATES PATENTS 3,297,600   1/1967   Blair et al. _____ 260—892

FOREIGN PATENTS 673,115   10/1963   Canada.
644,022   10/1960   Great Britain.

SAMUEL H. BLECH, Primary Examiner

M. J. TULLY, Assistant Eaminer

U.S. Cl. X.R.

260—29.6, 29.7, 95, 890, 891, 892, 893, 897